United States Patent Office.

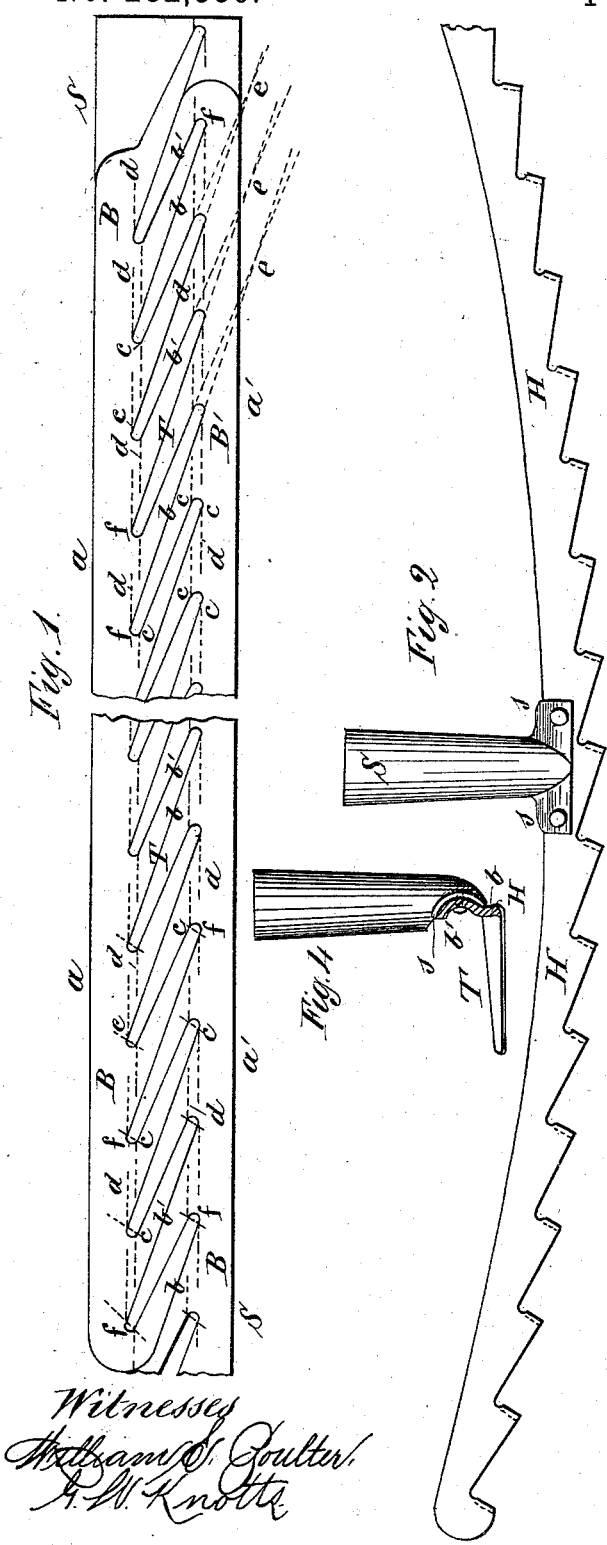

CARL A. LINDGREN, OF ESKILSTUNA, SWEDEN, ASSIGNOR TO THEODORE CARLSSON, OF SAME PLACE.

MODE OF MAKING METALLIC RAKES.

SPECIFICATION forming part of Letters Patent No. 282,336, dated July 31, 1883.

Application filed February 26, 1883. (No model.)

*To all whom it may concern:*

Be it known that I, CARL AUGUST LINDGREN, a subject of the King of Sweden, and a resident of Eskilstuna, in Sweden, have invented certain new and useful Improvements in Hand-Rakes; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

The invention has for its object the economical construction of rakes, and also to obtain a rake of great strength without materially enhancing its cost.

In the accompanying drawings, Figure 1 is a plan view illustrating the manner of forming the rake-teeth. Fig. 2 is a like view of the finished rake, having the form of a segment of a circle. Fig. 3 is an elevation thereof, and Fig. 4 a section on line $x\ x$ of Fig. 2.

In the above-described figures of drawings like letters indicate like parts.

In carrying out my invention I take a strip of metal, S, preferably of steel, and of the proper length, width, and thickness, which latter will necessarily depend upon the size of the rake and the length of its teeth, as well as the work it is to perform. From such a strip, S, I obtain two rake-blanks, B and B', without any waste or loss of metal, by forming the teeth of the blanks in such manner that those of one blank will be obtained by the metal cut out to form the interspaces of those of the other blank. This I effect by forming said teeth upon lines $b\ b'$ oblique to the opposite straight edges, $a\ a'$, and extending in opposite directions from points $c$ on two horizontal lines, $d$. (Shown in dotted lines in Fig. 1.)

It is evident that if the lines $b\ b'$ were produced they would intersect each other at points $e$, (also shown in dotted lines, Fig. 1,) and a tooth obtained that will terminate in an acute angle. By cutting the angle at some distance above its apex and joining the lines $b\ b'$ by a curved line, $f$, or semicircle, a tooth having a correspondingly-curved point will be obtained.

Thus it will be seen that the diameter of the tooth T at its smaller end may be readily regulated. By this method of laying out the teeth of a rake I obtain a tooth of uniform thickness, but of varying width—that is to say, a tooth tapering longitudinally, and having its greatest width, and consequently its greatest strength, at the point of connection with the rake-head H, or that portion of the blank that will form the rake-head.

After the blanks are stamped out, as described, the teeth T are bent to the desired angle to the rake-head by bending them upon lines at right angles to the axis of the tooth and intersecting the center of the semicircular termini $f$, when the rake will present the notched form shown in Fig. 2. When the teeth are bent as described, their broad faces will lie in the plane of resistance, or at right angles to the rake-head, and will present their edges to the work. This is of great importance, as the greatest amount of power with a minimum surface of resistance is thus obtained. From such a blank a rectilinear or a curvilinear rake may be obtained. The latter form is preferred, for the reason that it imparts greater strength to the rake, and also for the reason that it does better work, as such a rake will in its operation tend to "gather" the material operated upon and carry it toward the center of the rake, or toward the point where the power is applied.

Any suitable handle attachment may be connected to such a rake. In order, however, to increase the strength of the rake-head H, and also to provide an efficient surface to which the handle-socket may be connected, I use strips of metal of sufficient width to enable me to channel the outer edge, $a$ or $a'$, of the blank, giving it the curved form $a^2$. (Shown in Fig. 4 in section.) In connection with such a rake-head I use a conical sleeve, S, that is provided at its apex with laterally-projecting wing-plates $s$, of a curvature to fit the curvature of the rake-head.

The saving effected by this method of laying out the teeth of rake-blanks will be apparent to all those conversant with this branch of manufacture, and need therefore not be enlarged upon.

I desire it to be understood that I do not dedicate to the public any matter herein described or shown in the drawings, but not claimed— matter which may form the subject-matter of claims either in a separate application for patent or by a reissue of Letters Patent.

What I claim is—

The improvement in the art of making rakes integrally from a plate or bar of metal—namely, cutting the teeth in lines oblique to the edges or longitudinal axis of the plate or bar, then bending the teeth at or near their bases and without torsion into a plane lying at right angles to that of the remaining or head portion of the plate or bar, thus constituting a rake the teeth of which present their edges and flat portion or sides oblique to the line of movement of the rake when in use, as set forth.

In witness whereof I have hereunto signed my name in the presence of two subscribing witnesses.

CARL AUGUST LINDGREN.

Witnesses:
NERE A. ELFWING,
E. H. BRUHN.